Patented Sept. 27, 1932

1,879,637

UNITED STATES PATENT OFFICE

GEORGE H. REID, OF SOUTH CHARLESTON, WEST VIRGINIA, ASSIGNOR TO CARBIDE AND CARBON CHEMICALS CORPORATION, A CORPORATION OF NEW YORK

MANUFACTURE OF 1,4 DIOXANE

No Drawing.   Application filed February 20, 1930.  Serial No. 430,125.

The invention is a process for making 1,4 dioxane (diethylene dioxide).

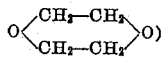

from $\beta\beta'$ dihalogen diethyl ethers, such as the dichloro compound, $$CH_2ClCH_2OCH_2CH_2Cl.$$

According to the invention the dihalogen ether is treated with an aqueous solution of a strong base, for example sodium hydroxide. The reaction is explained by the following equation:

$CH_2ClCH_2OCH_2CH_2Cl + 2NaOH =$

I have discovered that the best yields of 1,4 dioxane are obtained when a dilute solution of base is used. The rate of reaction is increased by raising the temperature, and I prefer to enclose the reacting materials in a pressure vessel, and to bring them to a temperature of 150° C. or above. The process, however, can be carried out at lower temperatures. Even at temperatures considerably above 150° C., the yield of 1,4 dioxane is good, and the proportion of by-products is comparatively small.

Excellent results have been obtained by using $\beta\beta'$ dichloro diethyl ether and a 5% aqueous solution of sodium hydroxide. On heating such a mixture (with the base preferably in moderate excess) to about 200° C. for 3½ hours, the yield of 1,4 dioxane is 90% or more. Stronger solutions of the base also give 1,4 dioxane, but if the concentration is too high the yield decreases, and more by-products, such as diethylene glycol, $\beta$ chloro ethyl vinyl ether, divinyl ether, acetaldehyde and aldehyde resins, are produced. I prefer that the concentration of base in the aqueous solution used shall not exceed 25%.

The dioxane can be conveniently recovered from the reaction liquid by distilling the latter up to a temperature of 100° C., collecting the distillate, which consists principally of dioxane and water, adding benzol thereto, and fractionally distilling. There are obtained, as successive distillates, a mixture of benzol and water boiling at 69° C.; benzol boiling at 79° C.; and dioxane boiling at 101° C. The recovery of the dioxane from the reaction liquid is not included in my invention.

The reagents can be continuously added to the reaction vessel with the continuous removal of the metal halide solution and the aqueous dioxane, the latter preferably through a fractionating apparatus, in which, as in the reaction vessel, a superatmospheric pressure is maintained. Instead of sodium hydroxide I may use potassium hydroxide, and the hydroxides of the other metals of the alkali and alkaline earth groups are doubtless more or less suitable.

I claim:
1. The process of making 1,4 dioxane which comprises reacting on $\beta\beta'$ dihalogen diethyl ether with a hot dilute aqueous solution of a strong inorganic base.
2. The process of making 1,4 dioxane which comprises reacting on $\beta\beta'$ dihalogen diethyl ether with a dilute aqueous solution of a strong inorganic base at a temperature above 150° C.
3. The process of making 1,4 dioxane which comprises reacting on $\beta\beta'$ dichloro diethyl ether with a dilute aqueous solution of sodium hydroxide at a temperature above 150° C.
4. The process of making 1,4 dioxane which comprises reacting on $\beta\beta'$ dihalogen diethyl ether with a hot aqueous solution of sodium hydroxide containing not more than 25% NaOH.
5. The process of making 1,4 dioxane which comprises reacting on $\beta\beta'$ dichloro diethyl ether with a hot aqueous solution of sodium hydroxide containing about 5% of NaOH.

In testimony whereof, I affix my signature.

GEORGE H. REID.